United States Patent

Gardner et al.

[11] 4,046,662
[45] Sept. 6, 1977

[54] ELECTRO-CHEMICAL MACHINE TOOLS

[75] Inventors: Charles Stanley Gardner, Allestree; Denis Edward Molloy, Mickleover, both of England

[73] Assignee: Rolls-Royce (1971) Limited, London, England

[21] Appl. No.: 627,787

[22] Filed: Oct. 31, 1975

[30] Foreign Application Priority Data

Nov. 6, 1974 United Kingdom ............ 47905/74

[51] Int. Cl.² .................... C25F 3/02; C25F 7/00
[52] U.S. Cl. ...................... 204/275; 204/129.6; 204/129.7
[58] Field of Search ............. 204/129.1, 129.6, 129.7, 204/229, 237, 279, 255, 257, 263, 269, 275, 224 M

[56] References Cited

U.S. PATENT DOCUMENTS

| | | | |
|---|---|---|---|
| 2,414,741 | 1/1947 | Hubbard | 204/279 |
| 2,673,232 | 3/1954 | Silsby, Jr. | 204/275 |
| 2,767,137 | 10/1956 | Evers | 204/129.6 |
| 2,937,124 | 5/1960 | Vaughan | 204/129.6 |
| 3,039,514 | 6/1962 | Swartzman | 204/129.6 |
| 3,445,372 | 5/1969 | Fromson | 204/129.6 |
| 3,755,127 | 8/1973 | Tyler et al. | 204/129.7 |
| 3,849,273 | 11/1974 | Johnson | 204/129.6 |

Primary Examiner—T. M. Tufariello
Attorney, Agent, or Firm—Cushman, Darby & Cushman

[57] ABSTRACT

In an electro-chemical machine tool electrolyte drainage flow is acted upon, on its way to the sump, by a device which breaks up the flow into isolated droplets, so as to prevent electrical leakage occurring via the electrolyte flow.

2 Claims, 1 Drawing Figure

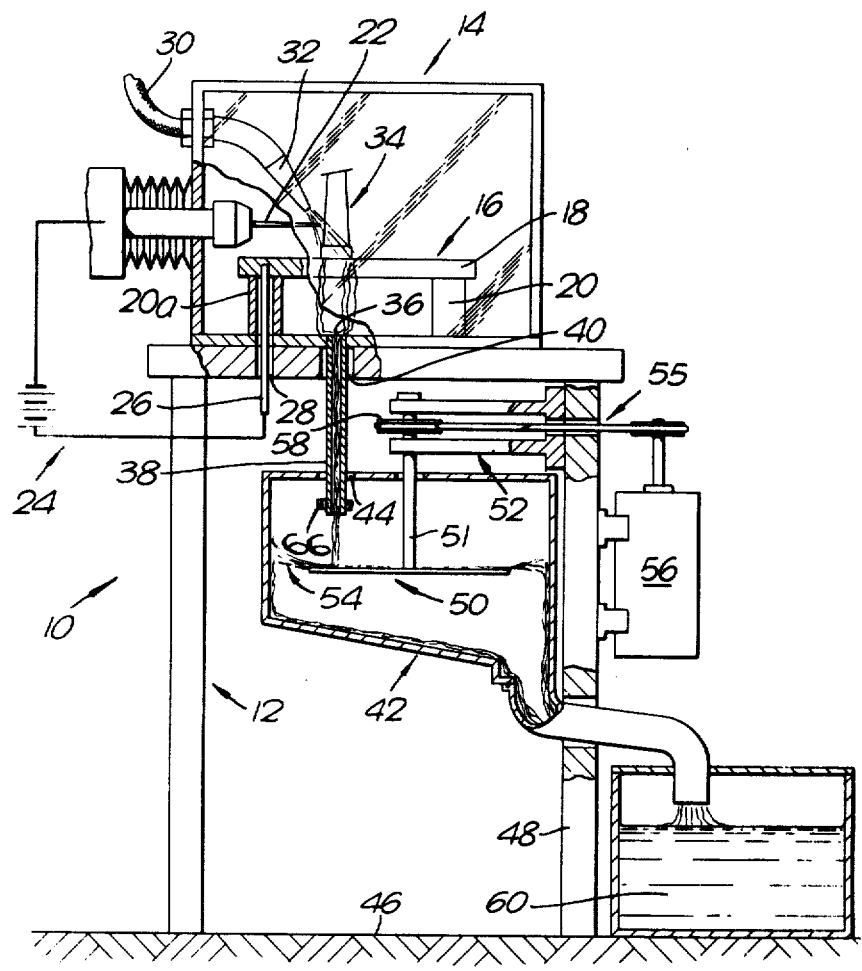

ELECTRO-CHEMICAL MACHINE TOOLS

This invention concerns methods of and apparatus for controlling current leakage in electro-chemical machine tools.

Present day electro-chemical machine tools suffer from the problem of leakage of electrolyte from their drainage system, which the resultant inherent danger of electrocution of their operators. Sometimes the leak can be blocked by repair to or replacement of the appropriate part or specific points may be electrically earthed to avoid the danger.

Such solutions are not satisfactory, for as regards the first action, repairs and replacements result in lost machining time, so production and profits are reduced and as regards the second action, excessive earthing of various points on the machine tool, in turn creates excessive current drain, which results in insufficient current bridging the gap between electrode and workpiece which further results in both increased machining time and inferior surface finish on the workpiece.

It is an object of this invention to obviate electrical leakage between the electrolyte drainage inlet and outlet of an electro-chemical machine tool so as to reduce the danger to operators and to improve machining efficiency.

The present invention comprises a method of draining electrolyte from the worktable of an electro-chemical machine tool including the steps of draining the electrolyte which runs from the tool worktable, via a conduit into a region containing droplet forming means so that said droplet forming means acts upon the electrolyte to form droplets thereof, which droplets are so dispersed as to prevent conduction of electricity between them and then collecting the droplets in a common collecting vessel.

The present invention includes apparatus for putting the method into effect, said apparatus comprising electrolyte draining apparatus comprising an electrolyte collecting vessel, an electrolyte drainage conduit connectable between an electro-chemical machine tool worktable and said electrolyte collecting vessel and electrolyte droplet forming means adapted to act upon electrolyte which has drained from said table via said drainage conduit so as to form it into droplets so dispersed as to prevent conduction of electricity between them, after which said droplets are caused to re-join in the electrolyte collecting vessel.

The invention will now be described by way of example, with reference to the accompanying drawing.

An electro-chemical machine tool 10, comprises a metal bed 12, a transparent plastic non-electrically conductive box 14, resting on bed 12, and containing a worktable 16 which has an electrically conductive top 18 and non-electrically conducting support legs 20, and an electrode 22. Worktable top 18 and electrode 22 are connected into an electrical circuit, shown diagrammatically at 24, such that the worktable top is positive and the electrode is negative. As can be seen in the drawing, one leg 20a of table 18 is hollow so as to accommodate the connection member 26 which connects table 18 into the circuit 24. An air gap surrounds member 26 so as to isolate it from bed 12.

An electrolyte supply is obtained via a conduit 30 which penetrates a wall of box 14 and terminates in a nozzle 32 directed at a common position on a workpiece 34 along with electrode 22.

During operation of the machine tool, the only vent for the electrolyte is in the base of box 14 at 36. An electrically non-conductive conduit 38 is fitted in sealing relationship in the base of box 14 with its upper extremity flush with the box base. Conduit 38 projects downwardly through the upper portion of bed 12 via a hole 40 which is large enough to provide an annular air gap between its wall and conduit 38, so as to provide electrical isolation for the bed, from any electrolyte which might seep through the seal between the box base and conduit 38, should breakdown of the seal occur.

The lower end of conduit 38 penetrates the top of an electrolyte separator tank 42 from which, again, it is separated by an annular air gap 44. Tank 42 is supported by means not shown from either the floor 46 or a side frame 48 of bed 12, the supporting means being of an electrically non-conducting material.

Separator tank 42 also contains a plane disc 50 which is suspended via a shaft 51 from bearings (not shown) mounted in the legs of a rigid plastic 'U' bracket 52 which in turn is rigidly fixed to side frame 48 at a position externally of tank 42. Thus disc 50 is rotatable about a vertical axis as viewed in the drawing.

The proportions and position of disc 50 is relation to tank 42, are such that a large clearance 54 is obtained between the disc rim and tank walls and the position of disc 50 in relation to the lower end of conduit 44 is such that electrolyte draining from conduit 44 falls onto the upper side of the disc, at a position afjacent the disc rim. Thus, on rotation of the disc at a suitable speed, which is achieved by virtue of a suitable rubber belt drive 55 from a motor 56 to a pulley 58 at the upper end of shaft 51, electrolyte is flung off the disc in directions tangentially thereto, in droplets so dispersed as to be electrically isolated from each other. Electric current is therefore prevented from flowing via the electrolyte and drains conduit, to earth.

On striking the sides of separator tank 42, the electrolyte runs downwards and regathers into a continuous stream. However, the break in electrical flow having been achieved, no electrical 'leaks' can accrue from the regathering thereof and the electrolyte passes to the re-circulating tank 60.

Means other than a rotary disc may be utilized in order to break up the stream of draining electrolyte, e.g. a rotary flail. or an oscillating paddle. Alternatively, a vibratory mechanism 66 could be attached to the lower extremity of conduit 38 as shown diagrammatically so as to vibrate it in a manner which destroys the continuity of flow of electrolyte as it leaves the conduit.

1. An electrolyte draining apparatus comprising:
    an electrolyte collecting vessel;
    an electrochemical machine tool worktable;
    an electrolyte drainage conduit connectable between said electrochemical machine tool worktable and said electrolyte collecting vessel;
    a rotary member positioned within said collecting vessel, said rotary member receiving a flow of electrolyte from said conduit; and
    means for rotating said rotary member at a speed sufficient to throw off said electrolyte therefrom in the form of droplets so dispersed as to prevent conduction of electricity therebetween, said dispersed electrolytic droplets being rejoined in said collector vessel.

2. An electrolyte draining apparatus comprising:
    an electrolyte collecting vessel;
    an electrochemical machine tool worktable;

an electrolyte drainage conduit connectable between said electrochemical machine tool worktable and said electrolyte collecting vessel; and a vibrating mechanism mounted on said conduit, means for vibrating said vibrating mechanism to effect the flow of drained electrolyte therefrom by transmitting vibrations to the walls of said conduit, said transmitted vibrations breaking up the flow of drained electrolyte into dispersed droplets to thereby prevent the flow of electricity therebetween.

* * * * *